March 5, 1940.                E. LEITZ, JR                     2,192,500
                           SHUTTER MECHANISM
                        Filed Sept. 29, 1937          3 Sheets—Sheet 1

INVENTOR
Ernst Leitz jr.
BY
ATTORNEY

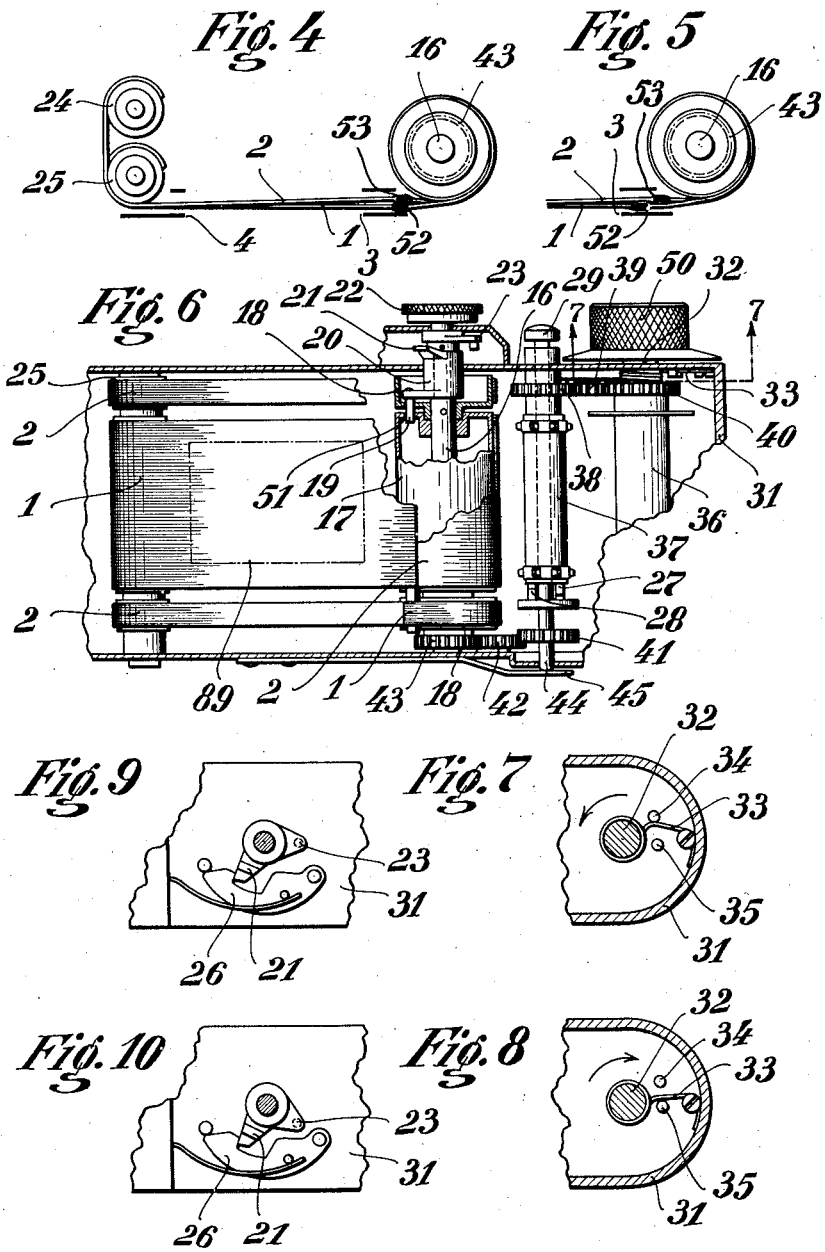

March 5, 1940.  E. LEITZ, JR  2,192,500
SHUTTER MECHANISM
Filed Sept. 29, 1937   3 Sheets-Sheet 3

INVENTOR
Ernst Leitz jr.
BY
Ivan E. A. Konigsberg
ATTORNEY

Patented Mar. 5, 1940

2,192,500

UNITED STATES PATENT OFFICE 2,192,500

SHUTTER MECHANISM

Ernst Leitz, Jr., Wetzlar, Germany, assignor to Ernst Leitz G. m. b. H., Wetzlar, Germany Application September 29, 1937, Serial No. 166,241
In Germany November 3, 1936

3 Claims. (Cl. 95—57)

This invention relates to improvements in curtain shutter mechanisms for photographic cameras in which the two shutter curtains move across the film window independently of each other. In such curtain shutters the two adjacent edges of the curtains overlap during and after the rewinding of the shutter. This is a disadvantage because the rear edge of the first curtain is a certain distance behind the leading edge of the second curtain due to the overlapping and thus the first curtain has to move through a longer distance before it reaches the beginning of the film window. Thus the first curtain has a greater speed when entering the film window which must be compensated for by more strongly tensioning the curtain spring for the second curtain. This is again a disadvantage because one is limited in the selection of springs for this purpose and this in turn results in a still further disadvantage in that, when it is desired to build an escapement mechanism for slow speeds into the camera, one is limited to a spring having a certain power.

The object of this invention is to provide a curtain shutter mechanism in which the two adjacent edges of the two curtains enter the film window area with the same speed or velocity whereby to obtain even exposure of all portions of the film in the film window when an exposure is made as will hereinafter appear. This includes the advantage that curtain springs of like power may be used and a greater range of materially shorter time exposures may be provided for. Accordingly the invention is embodied in a shutter mechanism arranged and constructed as hereinafter set forth and as illustrated in the accompanying drawings in which Figs. 1, 2 and 3 are curve diagrams illustrating the run of the shutter curtains.

Fig. 4 is an outline diagrammatic plan view illustrating the positions of the curtains when the edges are overlapping as also shown in Fig. 11.

Fig. 5 is a similar view which illustrates the position of the curtains according to this invention and with parts broken away. In this view the curtain edges are alined as also shown in Fig. 14.

Fig. 6 is a view of a camera including the improvement according to this invention with parts in section and parts broken away. The view is from the rear of the camera towards the objective.

Figs. 7 and 8 are sectional detail views of a certain spring mechanism according to the invention.

Figs. 9 and 10 are detail views of certain parts of the camera mechanism taken on the line 7—7 in Fig. 6.

Figure 1:
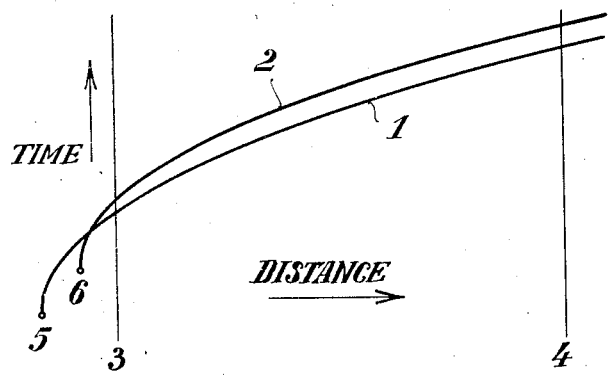
Figure 2:
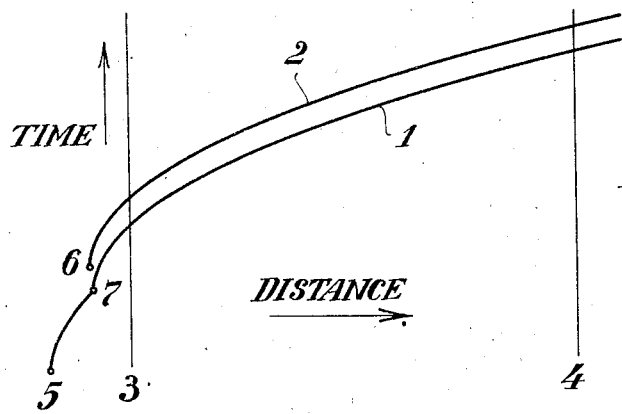
Figure 3:
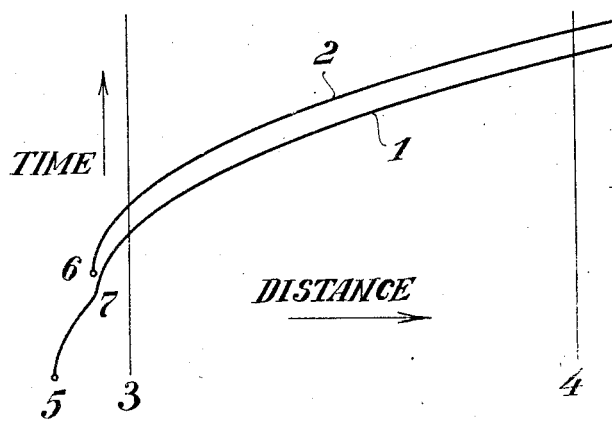

The diagrams in Figs. 1, 2 and 3 illustrate the movements of the shutter curtains. The leading or first curtain is marked 1, the second curtain is marked 2. The numerals 3 and 4 indicate the edges of the film window within which the exposure takes place. The movement across the film window is marked "distance" and the time of exposure is marked "time." The numeral 5 indicates the starting point of the first curtain 1 and the numeral 6 indicates the starting point of the second curtain 2. It will be seen that the distance 5—3 is the length of movement of the first curtain from starting point to the first edge of the film window and the distance 5—4 is the length of movement across the film window. The same explanation holds good for the distances 6—3 and 6—4.

Diagram Fig. 1 shows the movements of the curtains in a shutter in which the edges of the curtains overlap as in known structures. It will be seen that when the first curtain 1 reaches the starting point 6 of the second curtain 2, the first curtain has already attained a certain speed ahead of the second curtain. Therefore it is necessary to provide a stronger spring or more strongly wound spring for the second curtain to make up for this difference in speed in order to obtain correct even exposures. This difference in speed is due to the fact that the curtains overlap so that the first part of the movement of the first curtain simply serves to uncover the overlapping edge of the second curtain.

Diagram Fig. 2 shows a curtain movement according to the invention in which the overlapping is eliminated by means hereinafter described. In this figure as well as in Figure 3 the numeral 7 indicates a point at which the movement of the first curtain is delayed and the speed thereof decreased to an extent to correspond to the speed of the second curtain and before the two curtains enter the film window.

Diagram Fig. 3 shows the curtain movements according to a modified construction as will be explained hereinafter. In this modification the effect of the overlapping of the curtain edges is eliminated at the beginning or just before the beginning of the exposure.

By comparing the curve diagrams it will be seen that the curves 1 and 2 in Fig. 1 are not parallel which shows that the film is not evenly exposed, it being under-exposed at the beginning of the exposure. In Figs. 2 and 3 however, the curves 1 and 2 are parallel indicating even exposure of all parts of the film. The diagrams in Figs. 2 and 3 indicate in one sense a curtain opening of constant width but this is merely a result of the particular exposure selected for illustration. The present invention is directed to shutter curtains which move independently of each other and in which a constant width or slit is not involved. For instance, when the shutter is set for a time exposure the first curtain moves across the exposure area at its own speed so that the entire area is exposed before the second curtain starts to move. If in such a case, i. e. time exposure the curtains operate at uneven speeds, uneven exposure will result as indicated in Fig. 1.

Referring now to Fig. 6 the numeral 31 denotes a miniature camera of a well known type in which the leading curtain 1 has its left hand edge connected to its spring roller 24 and its right hand edge connected to ribbon drums 18, 18 by ribbons as usual. The second follow up curtain 2 has its left hand edge connected by ribbons to its spring roller 25 and its right hand edge connected to the curtain roller 17. In Figs. 4, 5, 11 and 14 the relative positions of the curtain edges are shown. In these figures the right hand opening edge of curtain 1 is marked 52. The left hand closing edge of curtain 2 is marked 53. The curtain roller 17 is rotatably supported on the curtain shaft 16 which is in driving connection with the shutter release shaft 44 by gears 43, 42 and 41. The shaft 44 has clutch members 28 in engagement with other clutch members 27 on the film transport roller 37. The clutch members are clutched together by a spring 45. The shaft 44 extends upwards through the roller 37 and has at the top a shutter release button 29. The release shaft 44 is in driving connection with the shutter rewinding and film advancing shaft 32 by a train of gears 38, 39 and 40. The shaft 32 is actuated by a knob 50 and also rotates the film spool 36. All of these elements are well known in the art.

The ribbon drums 18 are fast on the shaft 16. The curtain roller has a driving connection with the upper drum 18 by means of a hole 51 through which extends a pin 19 which passes through a circular slot in the drum 18. The pin 19 is part of a nipple 20, loose on the shaft 16. The nipple carries a tooth 21 adapted to engage a spring pressed pawl 26. Above the nipple 20 the shaft 16 carries an arm with a pin 23.

The shutter is opened by depressing the shutter release shaft 44 to uncouple the clutch 28—27 and the spring roller 24 now draws the first curtain 1 across the film window 89 unwinding the first curtain ribbons from the drums 18 rotating the latter and the shaft 16. The shutter is now being opened as the right hand edge 52 of the curtain 1 moves to the left in the drawing away from the left hand edge 53 of curtain 2. The curtain roller 17 cannot rotate at this time because of the pin 19 which is held immovable with the nipple 20 by the pawl 26, Figs. 9 and 10. However, the rotation of the shaft 16 also rotates the pin 23 until the latter by contacting the pawl 26 releases the nipple 20 and the second curtain roller is now free to rotate, the second curtain being drawn across the film window 89. The space between the adjacent edges of the two curtains forms the exposure opening as will be understood. It will further be understood that the knob 22 on the shaft 16 is the usual shutter speed dial knob for regulating the release of the second curtain and thus vary the size of the exposure opening.

After an exposure has been made, the spring 44 again causes the members 28—27 to clutch and the operator rewinds the shutter and advances the film by rotating the shaft 32 clockwise as it is seen in Figs. 4 and 5 and anticlockwise as seen in Fig. 7. At the end of the shutter rewinding movement, the edges 52 and 53 of the two curtains overlap as shown in Fig. 4. In order to eliminate the effect of the overlapping as referred to above, the shaft 32 is provided with a spring 33. One end of the spring is coiled around the shaft 32 in frictional engagement therewith, the other end is attached to the camera 31 as shown. The spring arm is movable between two stops 34 and 35. As the shaft 32 is rotated in the direction of the arrow in Fig. 7 to rewind the shutter the coil of the spring 33 is loosened slightly to permit the shaft to rotate within the coil and because of this slight loosening of the coil the spring arm is moved against the stop 34. When the operator lets go of the knob 50, the spring roller 24 for the first curtain will again pull on this curtain to open it and therefore shaft 32 will be rotated anticlockwise or run back a slight distance sufficient to move the first curtain from the position in Fig. 4 into the position in Fig. 5 where the two curtain edges meet or lie in substantially the same plane normal to the plane of the exposure area. The reverse movement of the shaft 32 is stopped by the tightening of the spring coil which movement causes the spring arm to move against the other stop 35 as in Fig. 8.

The first curtain has therefore been advanced a distance limited by the space between the stops 34 and 35 and this space is measured to permit an unwinding movement of the first curtain which will bring the two curtain edges to meet as in Fig. 3 and the curtain edges no longer overlap at the beginning of the shutter opening. The movements of the shutter curtains will therefore be as diagrammed in Fig. 2 where it will be observed that the first curtain edge is in the same plane as the second curtain edge so that both curtains start from the same position when the shutter is opened. It will also be noted that when the first curtain is thus given a slight advanced movement the pin 23 will have moved closer to the pawl 26 as shown in Fig. 10, hence the second curtain will be released so much sooner and both curtains enter the film window area at the same speed.

Figure 12:
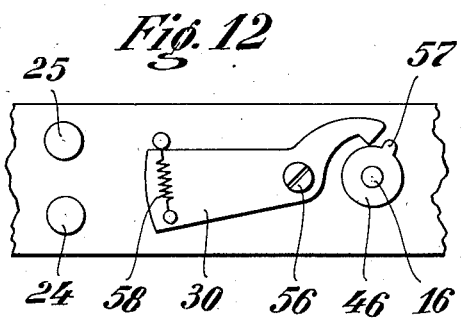
Fig. 12 is a detail view looking in the direction of arrow 12 in Fig. 11.
Figure 13:
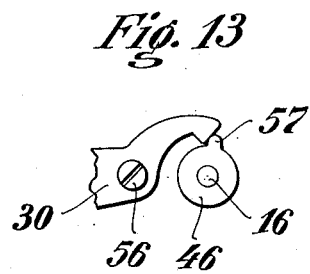
Fig. 13 is a detail view of parts shown in Fig. 12.
Figure 11:
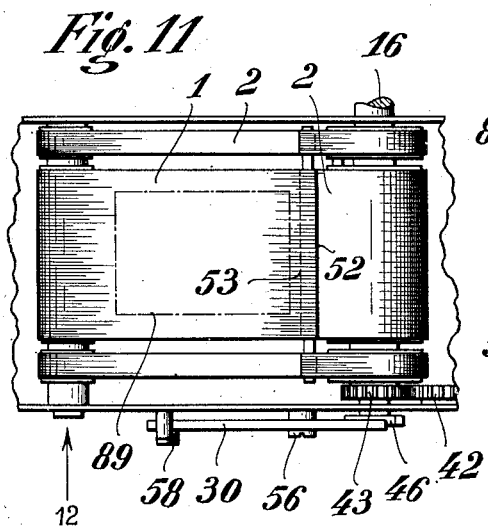
Fig. 11 is a view of a part of the camera mechanism, with parts removed, illustrating a modification.

Figs. 11–13 illustrate a modification in which the overlapping of the curtain edges is eliminated just before or at the moment when the shutter is opened. In this construction there is provided a pawl 30 which is pivoted at 56 to the bottom of the camera mechanism as shown in Fig. 11. The pawl is kept in engagement with a disk 46 having a nose 57 by means of a relatively weak spring 58. The disk is secured to the curtain shaft 16. Fig. 12 shows the parts in their positions when the shutter has been rewound and the two curtain edges now overlap as in Fig. 11. When now the shutter release 29 is depressed to make an exposure, the spring roller 24 pulls on the first curtain and the curtain shaft 16 is rotated until the nose 57 is against the pawl 30 as in Fig. 13. The pawl therefore causes a momentary braking or retardation of the movement of the first curtain and the overlapping of the curtain edges no longer exists. The delay is momentary only because the force of the spring roller 24 overcomes the weaker spring 58 so that the pawl 30 is pushed aside by the nose 57, the first curtain enters the exposure area and the shutter is opened. The second curtain is thereafter released as above described by the mechanism shown in Figs. 9 and 10. The arrangement is such that the edge 52 of the first curtain 1 enters the exposure area at the same speed as that of the edge 53 of the second curtain 2.

Figure 14:
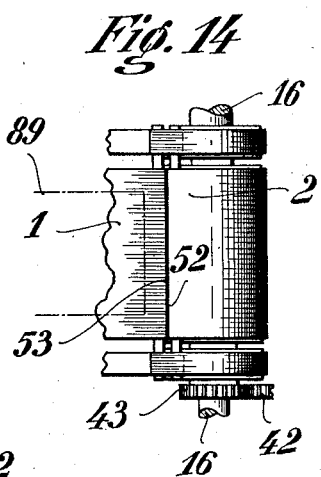
Fig. 14 is a detail view showing the position of the curtain edges in elevation corresponding to the position shown in Fig. 5.

This construction includes as a special advantage that because of the constant initial balanced speed of the shutter curtains very exact regulation of the exposure opening is made possible, particularly for shorter exposures. If very short exposures are regulated and obtained by merely setting the shutter to move with a very fine narrow opening it will be found that the real exposure does not begin until the narrow opening has been moved some distance in over the exposure area. Fig. 14 shows the positions of the two curtains in elevation after the first curtain has been advanced.

From the foregoing it will be seen that this invention provides a mechanism for eliminating the overlapping position of the curtain edges before the exposure is made or before the curtain edges enter the film window area so that the edge of the first curtain which forms one side of the exposure opening enters the film window area with the same speed as the leading edge of the second curtain.

I claim:
1. In a camera, a curtain shutter consisting of two curtains the edges of which define the exposure opening, means for releasing said curtains successively to make an exposure, said curtains moving with accelerated motion when released, means for rewinding said curtains after an exposure, the curtain edges which define the exposure opening being in overlapping relation during and after the rewinding operation, means automatically operable upon completion of the rewinding operation for moving one of said curtains to eliminate said overlapping relation and means for retarding the movement of the curtain first released whereby the said curtain edges enter the exposure area at the same speed.

2. A shutter according to claim 1 including means for moving one of the curtains to bring its exposure defining edge into alinement with the exposure defining edge of the other curtain and maintain said curtain edges in alinement before said curtains are released.

3. In a camera, a curtain shutter consisting of a leading and a follow up curtain having adjacent free edges for defining the exposure opening, means for releasing said curtains successively to make an exposure, said curtains moving with accelerated motion when released, means for rewinding said curtains after an exposure, the adjacent free edges of said curtains remaining in overlapping relation during and after the rewinding operation and means, operable upon the release of said curtains, for imparting to the leading curtain a movement of predetermined length to eliminate the overlapping of the curtain edges before the latter enter the exposure area of the camera whereby said edges enter said area at the same speed.

ERNST LEITZ, Jr.